(12) United States Patent
McGloughlin et al.

(10) Patent No.: US 8,262,003 B2
(45) Date of Patent: Sep. 11, 2012

(54) TWO-PART SPRAY APPLICATION SYSTEM AND METHOD

(75) Inventors: Brian J. McGloughlin, Pittsfield Township, MI (US); James M. Sute, Trenton, MI (US); Peter M. Hannish, Shelby Township, MI (US); Matthew L. Blaisdell, Canton, MI (US); Nicholas P. Howell, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2013 days.

(21) Appl. No.: 11/225,389

(22) Filed: Sep. 13, 2005

(65) Prior Publication Data

US 2007/0057082 A1    Mar. 15, 2007

(51) Int. Cl.
*B05B 9/06* (2006.01)
(52) U.S. Cl. .......................... 239/100; 239/11
(58) Field of Classification Search .......... 239/100, 239/67–72, 398, 413, 303, 304, 333, 351, 239/DIG. 14, 11; 427/8, 421, 422; 118/300, 118/302

See application file for complete search history.

(56) References Cited

U.S. PATENT DOCUMENTS

| | | | | |
|---|---|---|---|---|
| 4,392,611 A * | 7/1983 | Bachman et al. | ............... | 239/74 |
| 4,637,547 A * | 1/1987 | Hiniker et al. | ..................... | 239/1 |
| 5,215,253 A * | 6/1993 | Saidman et al. | ................ | 239/61 |
| 5,330,783 A * | 7/1994 | Saidman et al. | ................... | 427/8 |
| 6,126,039 A | 10/2000 | Cline et al. | | |

FOREIGN PATENT DOCUMENTS

| | | |
|---|---|---|
| DE | 2700875 C2 | 12/1978 |
| DE | 4225072 C2 | 8/1996 |

* cited by examiner

*Primary Examiner* — Davis Hwu

(57) ABSTRACT

The invention concerns a two-part spray application system and method for applying a two-part spray on an object. First and second pumps have outlets, with the pressure at each outlet monitored by pressure transducers. During the spraying process for each object, the pressure at the outlet of each pump must exceed a minimum threshold pressure at least once, or a fault condition is indicated. Such fault conditions may indicate a leak or disconnect in a hose downstream of the pumps.

20 Claims, 2 Drawing Sheets

TWO-PART SPRAY APPLICATION SYSTEM AND METHOD

BACKGROUND OF INVENTION

The present invention relates generally to a two-part spray application system and method, and in particular to such a system and method having error protection to detect potential failures in the system.

Spray-on applications for vehicle bodies and other large objects are well known. Such applications may include, for example, primer, paint, clearcoat and foam. For foam and clearcoat in particular, the spray-on application requires the mixing of two components immediately prior to the application. In order to achieve the proper application, then, the proper ratio of the components must be supplied to the applicator.

For clearcoat, it is important that the correct ratio of resin and hardener is applied. If the ratio is too far off, then the clearcoat will not cure properly. Fixing such a problem is not easy either since a new coating of clearcoat will not adhere to the previous out-of-ratio clearcoat layer when the ratio is beyond certain limits. Consequently, when a malfunction occurs that causes out-of-ratio clearcoat to be applied, the vehicle body typically needs to be scrapped, costing time and money.

Moreover, since clearcoat is transparent, one cannot tell with an initial visual inspection immediately after spraying whether the correct mixture was applied. The out-of-ratio mixture only becomes apparent upon visual inspection after the vehicle emerges from the paint oven. This may mean 45 minutes before initially detecting a malfunction in the paint booth. During this time, a significant number of vehicles can be sprayed with the incorrect clearcoat mixture before the malfunction is detected. Thus, the problem is compounded by the fact that many vehicle bodies may be scrapped due to one malfunction in that paint booth. This problem, for example, can cause anywhere from ten to thirty vehicle bodies to be scrapped.

While current clearcoat spray application systems monitor pressure at various locations, the systems are inadequate to detect some malfunctions that cause an improper mixture of clearcoat to be applied. For example, a controller monitors pressure transducers located near outlets for the resin and hardener pumps to ensured that the outlet pressures stay below a maximum level. The controller also monitors pressure transducers located near inlets for the resin and hardener pumps to ensure that the inlet pressures stay above a minimum level. However, these systems miss some malfunctions that occur and are severe enough to cause an out-of-ratio condition for the clearcoat being applied. Such malfunctions may include, for example, a paint line downstream of a pump having a leak or a paint line coming off at the fitting of the applicator.

SUMMARY OF INVENTION

An embodiment of the present invention contemplates a method of applying a two-part spray on an object with a spray application system having a first pump for pumping a first spray material and a second pump for pumping a second spray material, the method comprising the steps of: spraying the object with the two-part spray; monitoring a first pressure of the first spray material adjacent to an outlet of the first pump while spraying the object; monitoring a second pressure of the second spray material adjacent to an outlet of the second pump while spraying the object; completing the spraying of the object; detecting if the first pressure exceeds a first minimum threshold pressure at least once while spraying the object; detecting if the second pressure exceeds a second minimum threshold pressure at least once while spraying the object; and indicating a fault condition if the first pressure does not exceed the first minimum threshold pressure or the second pressure does not exceed the second minimum threshold pressure at least once while spraying the object.

An embodiment according to the present invention may also contemplate a two-part spray application system for spraying a mixture of a first spray material and a second spray material on an object. The system may include a first pump having a first inlet and a first outlet, a second pump having a second inlet and a second outlet, a source of the first spray material operatively engaging the first inlet, a source of the second spray material operatively engaging the second inlet, and a mixing block operatively engaging the first and second outlets. A first outlet pressure transducer operatively engages the first outlet to detect a first outlet pressure of the first spray material, and a second outlet pressure transducer operatively engages the second outlet to detect a second outlet pressure of the second spray material. A controller is in communication with the first and second outlet pressure transducers and detects if the first outlet pressure exceeds a first minimum threshold pressure at least once while spraying the object, if the second outlet pressure exceeds a second minimum threshold pressure at least once while spraying the object, and indicates a fault condition if the first outlet pressure does not exceed the first minimum threshold pressure or the second outlet pressure does not exceed the second minimum threshold pressure at least once while spraying the object.

An advantage of an embodiment of the present invention is that the two-part spray application system can detect malfunctions downstream of the pumps quickly, thus minimizing costs associated with the malfunction. In a particular example of a two component clearcoat application to a vehicle body, the system provides continuous monitoring of resin and hardener pressure in proximity to the resin and hardener pump outlets, with fault detection indicated if the pressure at each of these pump outlets does not reach a minimum threshold pressure at least once during application of clearcoat to each vehicle body. Thus, malfunctions are quickly detected in the system downstream of the pumps while applying clearcoat.

Another advantage of an embodiment of the present invention is that minimal pats, such as car bodies, will need to be scrapped due to an off-ratio condition since the condition can be detected prior to visual inspection of the parts as they emerge from a paint oven.

DETAILED DESCRIPTION

Figure 1:
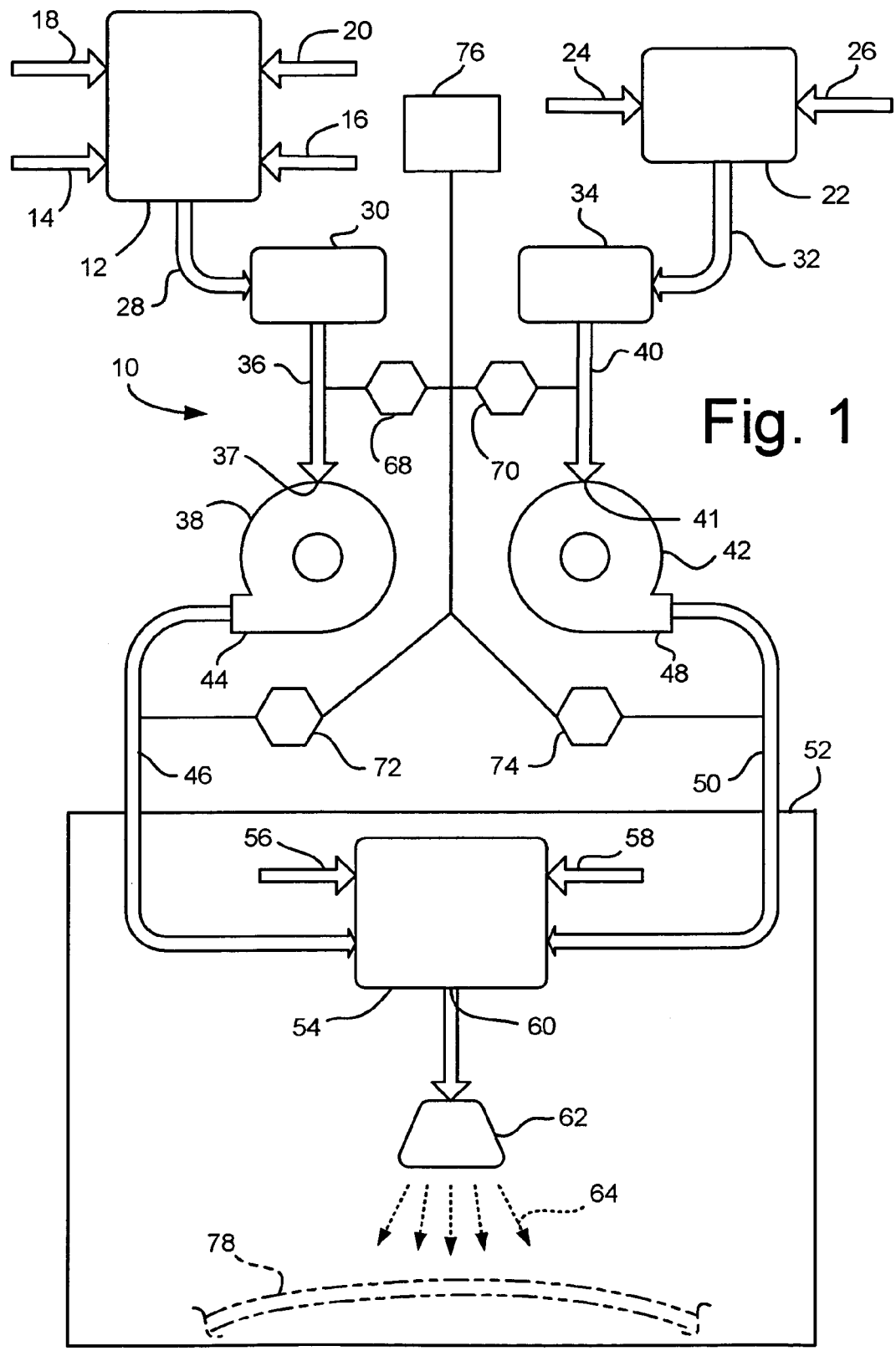
FIG. 1 is a schematic illustration of a portion of a two-part spray application system, in accordance with the present invention.

FIG. 1 is a schematic illustration of a portion of a two-part spray application system, indicated generally at 10, that is particularly suitable for applying clearcoat to an object such as a vehicle body 78. The system 10 includes a resin manifold 12, which may have a first resin inlet 14 and a second resin inlet 16, as well as a purge solvent inlet 18 and purge air inlet 20. The system also includes a hardener manifold 22, which may have a purge solvent inlet 24 and a hardener inlet 26. The resin manifold 12 includes an outlet line 28 in fluid communication with a resin fluid regulator 30, and the hardener manifold 22 includes an outlet line 32 in fluid communication with a hardener fluid regulator 34.

The resin fluid regulator 30 is in fluid communication with a resin pump inlet line 36, which, in turn, is in fluid communication with an inlet 37 to a resin pump 38. An outlet 44 of the resin pump 38 is in fluid communication with a resin pump outlet line 46. The hardener fluid regulator 34 is in fluid communication with a hardener pump inlet line 40, which, in turn, is in fluid communication with an inlet 41 to a hardener pump 42. An outlet 48 of the hardener pump 42 is in fluid communication with a hardener pump outlet line 50. Both outlet lines 46, 50 extend into a paint booth 52.

The paint booth 52 includes a mixing block 54 that has inlets in fluid communication with the resin pump outlet line 46 and the hardener pump outlet line 50. The mixing block 54 may also have a purge solvent inlet 56 and a purge air inlet 58. An outlet 60 of the mixing block 54 is in fluid communication with a paint applicator 62, which is adapted to spray and application 64, such as clearcoat, on the object, such as the vehicle body 78.

A resin pump inlet pressure transducer 68 is coupled to the resin pump inlet line 36 so that it can measure the pressure of the resin as it enters the resin pump 38. A hardener pump inlet pressure transducer 70 is coupled to the hardener pump inlet line 40 so that it can measure the pressure of the hardener as it enters the hardener pump 42. A resin pump outlet pressure transducer 72 is coupled to the resin pump outlet line 46 so that it can measure the pressure of the resin as it exits the resin pump 38, and a hardener pump outlet pressure transducer 74 is coupled to the hardener pump outlet line 50 so that it can measure the pressure of the hardener as it exits the hardener pump 42. The pressure transducers 68, 70, 72, 74 each communicate with a controller 76.

Since the individual components of the spray application system 10 discussed above are known to those skilled in the art, they will not be described in any further detail herein. Also, the spray application system 10 described above is generally repeated for each robot paint applicator in the paint booth 52 applying clearcoat to the particular vehicle body 78. The controller 76 may be in communication with other controllers for other robots in the paint booth 52 or may control multiple robots for the particular paint booth 52. And the controller may comprise any combination of hardware and software for communicating with the transducers as well as communicating with other portions of the spray application system.

Figure 2:
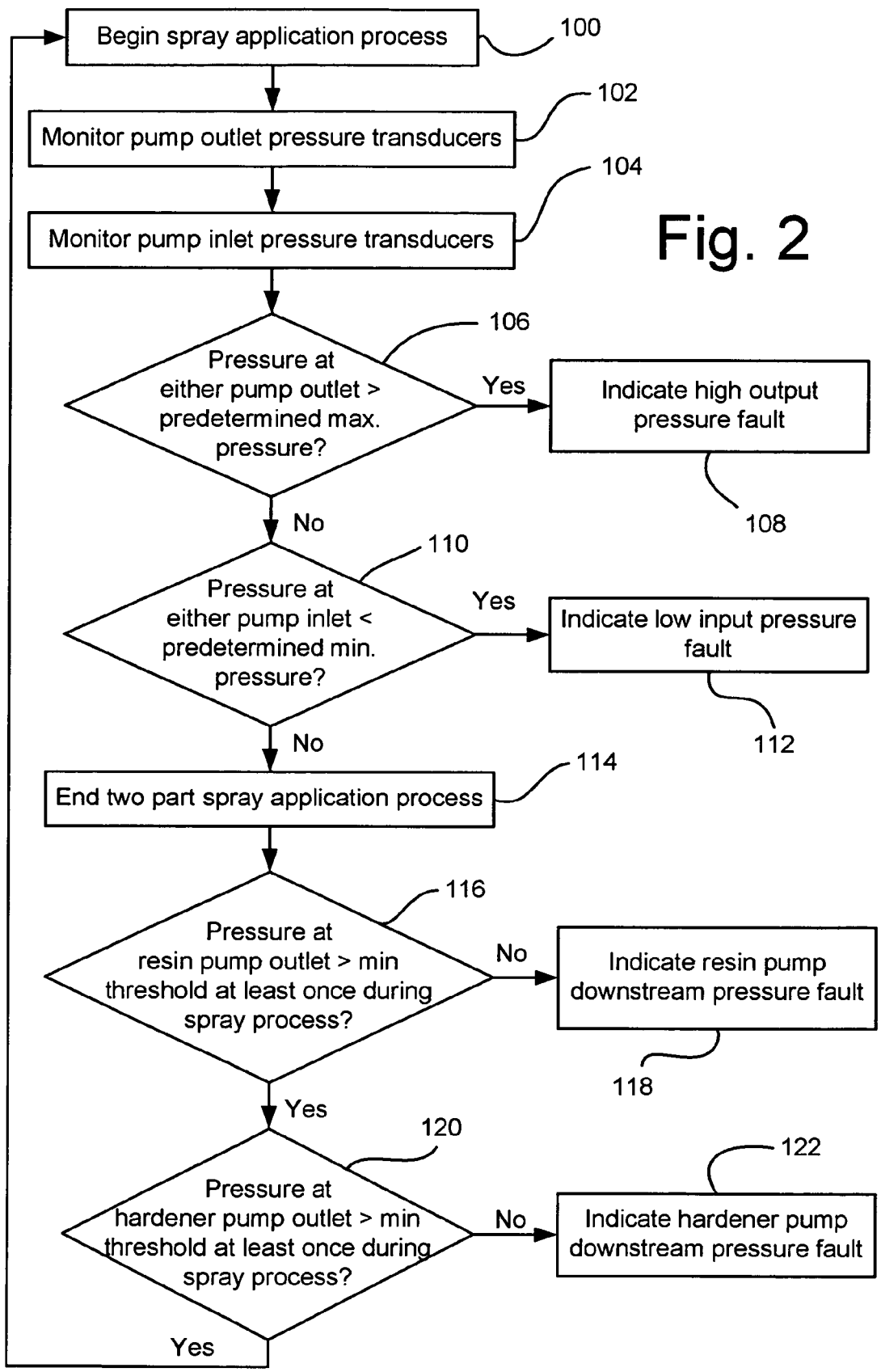
FIG. 2 is a flow chart illustrating a method of operating the system of FIG. 1.

FIG. 2 is a flow chart illustrating a method of operating the system 10 of FIG. 1. The process of applying the two component spray to the object, such as a vehicle body, step 100, is begun. This includes activating the resin and hardener pumps 38, 42 and opening various valves (not shown) to get the fluids flowing through the lines. The actions required to complete this step are conventional and known to those skilled in the art.

The pump outlet transducers 72, 74 for the resin pump 38 and the hardener pump 42 are monitored during the spray application process, step 102. Also, the pump inlet transducers 68, 70 for the resin and hardener pumps 38, 42 are monitored during the spray application process, step 104. If the pressure measured by either pump outlet pressure transducer 72, 74 exceeds a predetermined maximum pressure, step 106, then a high output pressure fault is indicated by the controller 76, step 108. This pressure may be, for example, about 250 pounds per square inch (1724 kilopascals). Such a fault may be caused by, for example, a mixing block valve (not shown) that is stuck or not opening properly, or the paint applicator 62 not triggering on properly. If the pressure measured by either pump inlet pressure transducer 68, 70 drops below a predetermined minimum pressure, step 110, then a low pressure fault is indicated by the controller 76, step 112. Such a fault may be cause by, for example, an outlet valve (not shown) for the hardener manifold 22 or resin manifold 12 that is not operational, or a broken fluid line between either manifold 12, 22 and the inlet of its corresponding pump 38, 42.

The process of applying the two component spray to the vehicle body 78 ends, step 114. A determination is made as to whether the pressure detected by the pressure transducer 72 near the resin pump outlet 44 exceeded a minimum threshold at least once during the spray application process for that particular vehicle body 78, step 116. The minimum threshold pressure may be, for example, a pressure that is somewhere in the range of about 90 to 110 pounds per square inch (620-758 kilopascals). The minimum threshold pressure is not meant to be set low enough that the pressure remains above this level during the entire spray process. Rather, it is preferred that the minimum threshold pressure be set high enough that the pressure needs only to exceed this threshold once during the application process to avoid a fault detection.

If the minimum threshold pressure is not exceeded at least once during the spray application process for that particular vehicle body 78, then a resin pump downstream pressure fault is indicated by the controller 76, step 118. If it does, then a determination is made as to whether the pressure detected by the pressure transducer 74 near the hardener pump outlet 48 exceeded a minimum threshold at least once during the spray application process for that particular vehicle body 78, step 120. If not, then a hardener pump downstream pressure fault is indicated by the controller, step 122. If it does, then the next vehicle body (not shown) is indexed into the paint booth 52 and the two-part spray application process is begun again, step 100. Alternatively, steps 116 and 120 can be reversed since the order of these two steps does not matter for purposes of this invention.

If all lines 46, 50 and other downstream components are intact, then the pump outlet pressure transducer readings will each exceed the minimum threshold pressure at some point of the spray process. This is particularly important for application of a two-part clearcoat since one cannot tell from a visual inspection of a vehicle body 78 as it leaves the paint booth 52 that the proper mixture of resin and hardener was applied. The proper mixture is assumed based on monitoring the outlet transducer pressures during the spraying application to assure that the minimum threshold pressure was achieved for each one.

On the other hand, if the minimum threshold pressure is never exceeded over the course of a spray path for one or both of these outlet pressure transducers 72, 74, then the controller 76 assumes there is a rupture in the lines 46, 50 or some other equipment malfunction. Again, this type of assumption is needed since one cannot tell if a correct ratio of resin to hardener was applied from a visual inspection as the vehicle body 78 leaves the paint booth 52. And by the time the vehicle body 78 leaves a paint oven (not shown)—where visual inspection can detect an off-ratio condition—many more vehicle bodies may be ruined having been sprayed with this improper mixture.

If either a resin or hardener pump downstream pressure fault is indicated, then, the fault indication may take the form of, for example, a message sent to a booth operator's panel (not shown) and to a dispatch for a pipe fitter to troubleshoot the paint booth 52 to determine why the fault occurred. The fault may indicate, for example, a motor-pump coupling (not shown) failure, a line rupture between one of the pumps 38, 42 and the mixing block 54, a leak in one of the pumps 38, 42, or a line rupture between the mixing block 60 and the applicator 62.

This monitoring is preferably done for each paint applicator 62 in the paint booth 52 since each has its own resin and hardener pumps and lines for supplying the resin and hardener in the correct ratio to its respective paint applicator. If any one of the pump output transducers on any of the paint applicators in a particular paint booth 52 does not reach the minimum pressure threshold at some point during its spray path for that particular vehicle body 78, then, preferably, a fault will be issued and will stop the operation of that booth 52. The controllers monitoring the operation for fault detection preferably also identify which pressure transducer indicated the fault in order to speed the diagnostics and repair of the system 10.

Even though the description of the best mode of the invention described a two component clearcoat application, it may also be employed with other two component spray on applications, such as, for example spray on structural foam.

While certain embodiments of the present invention have been described in detail, those familiar with the art to which this invention relates will recognize various alternative designs and embodiments for practicing the invention as defined by the following claims.

What is claimed is:

1. A method of applying a two-part spray on an object with a spray application system having a first pump for pumping a first spray material and a second pump for pumping a second spray material, the method comprising the steps of:
   spraying the object with the two-part spray;
   monitoring a first pressure of the first spray material adjacent to an outlet of the first pump while spraying the object;
   monitoring a second pressure of the second spray material adjacent to an outlet of the second pump while spraying the object;
   completing the spraying of the object;
   detecting if the first pressure exceeds a first minimum threshold pressure at least once while spraying the object;
   detecting if the second pressure exceeds a second minimum threshold pressure at least once while spraying the object; and
   indicating a fault condition if the first pressure does not exceed the first minimum threshold pressure or the second pressure does not exceed the second minimum threshold pressure at least once while spraying the object.

2. The method of claim 1 wherein the first spray material is a resin, the second spray material is a hardener and the two-part spray is a clearcoat.

3. The method of claim 1 wherein the first minimum threshold pressure is between 90 and 110 pounds per square inch.

4. The method of claim 3 wherein the second minimum threshold pressure is between 90 and 110 pounds per square inch.

5. The method of claim 1 further comprising the steps of:
   ceasing the step of spraying the object if the first pressure exceeds a predetermined maximum pressure; and
   ceasing the step of spraying the object if the second pressure exceeds the predetermined maximum pressure.

6. The method of claim 5 further comprising the steps of:
   monitoring a first inlet pressure of the first spray material adjacent to an inlet of the first pump while spraying the object;
   monitoring a second inlet pressure of the second spray material adjacent to an inlet of the second pump while spraying the object;
   ceasing the step of spraying the object if the first inlet pressure drops below a predetermined minimum pressure; and
   ceasing the step of spraying the object if the second inlet pressure drops below the predetermined minimum pressure.

7. The method of claim 1 further comprising the steps of:
   monitoring a first inlet pressure of the first spray material adjacent to an inlet of the first pump while spraying the object;
   monitoring a second inlet pressure of the second spray material adjacent to an inlet of the second pump while spraying the object;
   ceasing the step of spraying the object if the first inlet pressure drops below a predetermined minimum pressure; and
   ceasing the step of spraying the object if the second inlet pressure drops below the predetermined minimum pressure.

8. The method of claim 7 wherein the first spray material is a resin, the second spray material is a hardener and the two-part spray is a clearcoat.

9. The method of claim 7 wherein the first spray material is one of a resin and a hardener, the second spray material is the other of the resin and the hardener and the two-part spray is a clearcoat.

10. A method of applying a two-part spray on an object with a spray application system having a first pump for pumping a first spray material and a second pump for pumping a second spray material, the method comprising the steps of:
    spraying the object with the two-part spray;
    monitoring a first pressure of the first spray material adjacent to an outlet of the first pump while spraying the object;
    ceasing the step of spraying the object if the first pressure exceeds a predetermined maximum pressure;
    completing the spraying of the object;
    detecting if the first pressure exceeds a first minimum threshold pressure at least once while spraying the object; and
    indicating a fault condition if the first pressure does not exceed the first minimum threshold pressure at least once while spraying the object.

11. The method of claim 10 further comprising the steps of:
    monitoring a second pressure of the second spray material adjacent to an outlet of the second pump while spraying the object;
    ceasing the step of spraying the object if the second pressure exceeds the predetermined maximum pressure;
    detecting if the second pressure exceeds a second minimum threshold pressure at least once while spraying the object; and
    indicating a fault condition if the second pressure does not exceed the second minimum threshold pressure at least once while spraying the object.

12. The method of claim 9 further comprising the steps of:
    monitoring a first inlet pressure of the first spray material adjacent to an inlet of the first pump while spraying the object;

monitoring a second inlet pressure of the second spray material adjacent to an inlet of the second pump while spraying the object;

ceasing the step of spraying the object if the first inlet pressure drops below a predetermined minimum pressure; and ceasing the step of spraying the object if the second inlet pressure drops below the predetermined minimum pressure.

13. The method of claim 10 further comprising the steps of:

monitoring a first inlet pressure of the first spray material adjacent to an inlet of the first pump while spraying the object; and ceasing the step of spraying the object if the first inlet pressure drops below a predetermined minimum pressure.

14. The method of claim 10 further comprising the steps of:

monitoring a second pressure of the second spray material adjacent to an outlet of the second pump while spraying the object;

detecting if the second pressure exceeds a second minimum threshold pressure at least once while spraying the object; and indicating a fault condition if the second pressure does not exceed the second minimum threshold pressure at least once while spraying the object.

15. A two-part spray application system for spraying a mixture of a first spray material and a second spray material on an object, the system comprising:

a first pump having a first inlet and a first outlet;

a second pump having a second inlet and a second outlet;

a source of the first spray material operatively engaging the first inlet;

a source of the second spray material operatively engaging the second inlet;

a mixing block operatively engaging the first and second outlets;

a first outlet pressure transducer operatively engaging the first outlet to detect a first outlet pressure of the first spray material;

a second outlet pressure transducer operatively engaging the second outlet to detect a second outlet pressure of the second spray material; and a controller, in communication with the first and second outlet pressure transducers, for detecting if the first outlet pressure exceeds a first minimum threshold pressure at least once while spraying the object, detecting if the second outlet pressure exceeds a second minimum threshold pressure at least once while spraying the object, and indicating a fault condition if the first outlet pressure does not exceed the first minimum threshold pressure or the second outlet pressure does not exceed the second minimum threshold pressure at least once while spraying the object.

16. The system of claim 15 further including a first inlet pressure transducer in communication with the controller and operatively engaging the first inlet to detect a first inlet pressure of the first spray material, a second inlet pressure transducer in communication with the controller and operatively engaging the second inlet to detect a second inlet pressure of the second spray material, and wherein the controller is adapted to cease the spraying of the object if the first inlet pressure drops below a predetermined minimum pressure or the second inlet pressure drops below the predetermined minimum pressure.

17. The system of claim 16 wherein the controller is adapted to cease the spraying of the object if the first outlet pressure or the second outlet pressure exceeds a predetermined maximum pressure.

18. The system of claim 15 wherein the controller is adapted to cease the spraying of the object if the first outlet pressure or the second outlet pressure exceeds a predetermined maximum pressure.

19. The system of claim 15 wherein the first spray material is a resin and the second spray material is a hardener that combine to form a clearcoat application.

20. The system of claim 15 wherein the first and second minimum threshold pressures are between 90 and 110 pounds per square inch.

\* \* \* \* \*